US011252153B2

(12) United States Patent
Kim et al.

(10) Patent No.: US 11,252,153 B2
(45) Date of Patent: Feb. 15, 2022

(54) METHOD OF PROVIDING MUTUAL AUTHENTICATION OF CONTENTS IN SOCIAL MEDIA SERVICE, AND SERVER, USER TERMINAL, AND APPLICATION IMPLEMENTING THE METHOD

(71) Applicant: KAKAO CORP., Jeju-si (KR)

(72) Inventors: Myungjun Kim, Seoul (KR); Jae Ho Kim, Seongnam-si (KR); Dongwook Suh, Seongnam-si (KR); Jaewoo Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 41 days.

(21) Appl. No.: 16/655,518

(22) Filed: Oct. 17, 2019

(65) Prior Publication Data

US 2020/0128010 A1 Apr. 23, 2020

(30) Foreign Application Priority Data

Oct. 18, 2018 (KR) .................. 10-2018-0124748

(51) Int. Cl.
*H04L 29/06* (2006.01)
*H04L 9/32* (2006.01)
(Continued)

(52) U.S. Cl.
CPC ...... *H04L 63/0869* (2013.01); *G06F 16/2246* (2019.01); *H04L 9/30* (2013.01); *H04L 9/3242* (2013.01); *H04L 9/3247* (2013.01)

(58) Field of Classification Search
None
See application file for complete search history.

(56) References Cited

U.S. PATENT DOCUMENTS

| 9,654,431 | B1* | 5/2017 | Johansson | ............... H04L 51/18 |
| 2009/0282466 | A1* | 11/2009 | Uchida | ................. H04L 9/3231 |
| | | | | 726/7 |

(Continued)

FOREIGN PATENT DOCUMENTS

| KR | 10-0991855 | 11/2010 |
| KR | 10-1795696 | 11/2017 |

OTHER PUBLICATIONS

Lou et al., A Blockchain-based key Management Scheme for Named Data Networking, 2018, Proceedings of the 2018 1st IEEE International Conference on Hot Information0Centric Networking (HodICN 2018), pp. 141-146. (Year: 2018).*

(Continued)

*Primary Examiner* — Luu T Pham
*Assistant Examiner* — Edward X Long
(74) *Attorney, Agent, or Firm* — Lex IP Meister, PLLC

(57) ABSTRACT

Disclosed is a method of providing, by a server, mutual authentication of mutual authentication participants for contents of a social media service, the method including: receiving requestor authentication information generated in a terminal of a requestor requesting mutual authentication for specific contents; receiving acceptor authentication information generated in a terminal of an acceptor accepting the mutual authentication for the specific contents; and verifying the requestor authentication information and the acceptor authentication information, and storing the specific contents included in the requestor authentication information and the acceptor authentication information as mutually authenticated contents of the requestor and the acceptor. The requestor authentication information includes the specific contents and a signature of the requestor for the specific contents, and the acceptor authentication information includes the specific contents and a signature of the acceptor for the specific contents. The specific contents are selected (Continued)

in the terminal of the requestor displaying contents provided in the social media service and then is transmitted to the terminal of the acceptor.

16 Claims, 10 Drawing Sheets

(51) Int. Cl.
*H04L 9/30* (2006.01)
*G06F 16/22* (2019.01)

(56) References Cited

U.S. PATENT DOCUMENTS

| | | | | |
|---|---|---|---|---|
| 2013/0133038 A1* | 5/2013 | DeLuca | ................ | H04L 63/083 |
| | | | | 726/4 |
| 2015/0244699 A1* | 8/2015 | Hessler | .................. | G06F 21/44 |
| | | | | 726/7 |
| 2017/0359338 A1* | 12/2017 | Tschofenig | ............. | G06F 21/34 |
| 2018/0075058 A1* | 3/2018 | Boutnaru | ................ | H04L 63/04 |

OTHER PUBLICATIONS

Yan et al., Anonymous Authentication for Trustworthy Pervasive Social Networking, 2015, IEEE Transaction on Computational Social Systems, pp. 88-98. (Year: 2015).*

* cited by examiner

FIG. 1
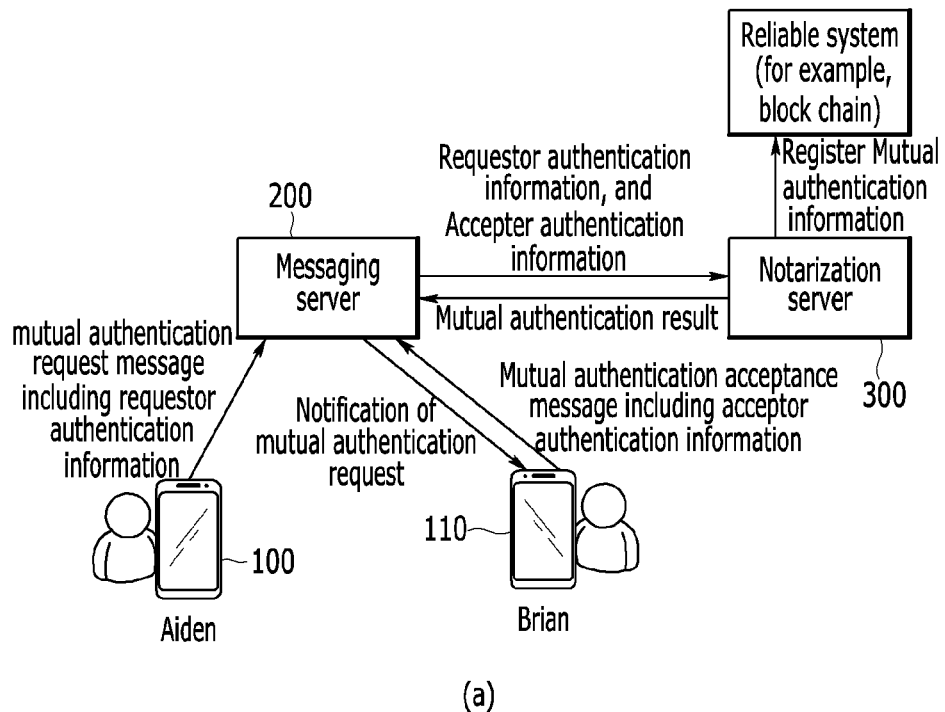
(a)
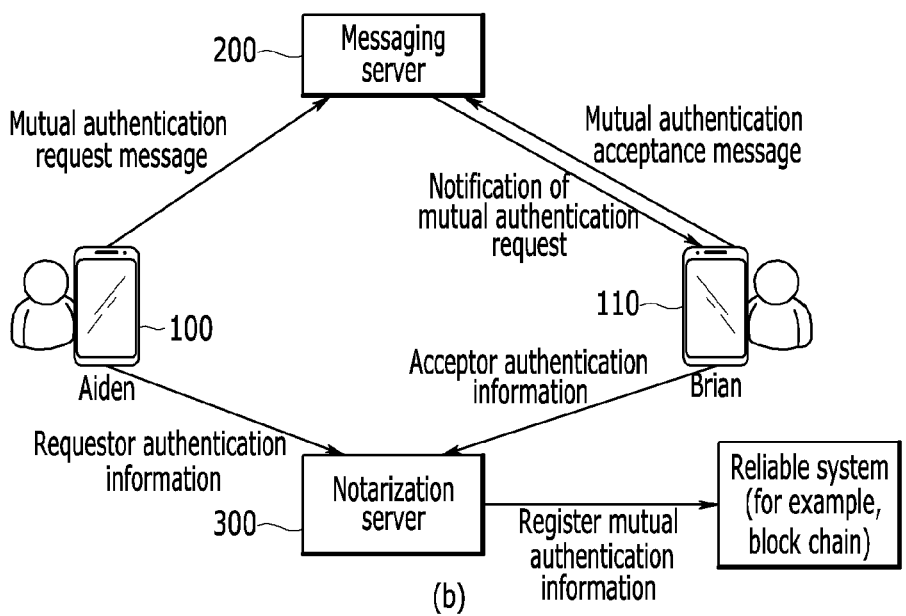
(b)

METHOD OF PROVIDING MUTUAL AUTHENTICATION OF CONTENTS IN SOCIAL MEDIA SERVICE, AND SERVER, USER TERMINAL, AND APPLICATION IMPLEMENTING THE METHOD

CROSS-REFERENCE TO RELATED APPLICATION

This application claims priority to and the benefit of Korean Patent Application No. 10-2018-0124748 filed in the Korean Intellectual Property Office on Oct. 18, 2018, the entire contents of which are incorporated herein by reference.

BACKGROUND (a) Field

The present disclosure relates to mutual authentication.

(b) Description of the Related Art

There are various social media services, such as KakaoTalk, Twitter, Facebook and Instagram. Users can chat with each other through social media services and express their thoughts. Users may exchange messages with friends in chat rooms through an instant messaging service, such as KakaoTalk.

Until now, when a user wants to keep messages exchanged in the chat room, the user has to keep the chat room in which the messages are recorded, without deleting the chat room, or capture the chat room to keep the messages as images. Keeping the chat room may be difficult to find messages to be kept when conversation contents are continuously accumulated. And a counterpart may leave the chat room. When the counterpart leaves Kakao Talk application, the counterpart is indicated with "unknown", so that it may not be easy to specify the counterpart. Capturing the chat room and storing the messages in the form of the image, only one screen is captured as one image. Therefore, there is a disadvantage in that long conversation contents need to be screen-captured one by one. Further, the keeping method allows message deletion or image tempering, so that there may be limitations or quarrels in giving a legal effect as proof of conversation contents.

Users may personally keep the messages exchanged in the chat rooms, but later there may be disputes over whether the messages were actually exchanged.

The above information disclosed in this Background section is only for enhancement of understanding of the background of the invention and therefore it may contain information that does not form the prior art that is already known in this country to a person of ordinary skill in the art.

SUMMARY

Some embodiments of the present disclosure provide a method of mutually authenticating, by a plurality of users, contents (for example, conversation contents) transmitted by a social media service, such as an instant messaging service, and storing the mutually authenticated conversation contents, a server, a user terminal, and an application implementing the same.

Some embodiments of the present disclosure provide user interface through which conversation contents are conveniently mutually authenticated in a social media service, such as an instant messaging service.

An exemplary embodiment of the present disclosure provides a method of providing, by a server, mutual authentication to mutual authentication participants for contents of a social media service. The method includes: receiving requestor authentication information generated in a terminal of a requestor requesting mutual authentication for specific contents; receiving acceptor authentication information generated in a terminal of an acceptor accepting the mutual authentication for the specific contents; and verifying the requestor authentication information and the acceptor authentication information, and storing the specific contents included in the requestor authentication information and the acceptor authentication information as mutually authenticated contents by the requestor and the acceptor. The requestor authentication information may include the specific contents and a signature of the requestor for the specific contents, and the acceptor authentication information may include the specific contents and a signature of the acceptor for the specific contents. The specific contents may be selected in the terminal of the requestor displaying contents provided in the social media service and then may be transmitted to the terminal of the acceptor.

The signature of the requestor may be obtained by encrypting a hash value of the specific contents with a private key of the requestor, and the signature of the acceptor may be obtained by encrypting the hash value of the specific contents with a private key of the acceptor. The storing of the specific contents as the mutually authenticated contents may include: decrypting the signature of the requestor authentication information by using a public key of the requestor, and verifying whether the requestor has transmitted the specific contents included in the requestor authentication information based on a result of the decryption; and decrypting the signature of the acceptor authentication information by using a public key of the acceptor, and verifying whether the acceptor has transmitted the specific contents included in the acceptor authentication information based on a result of the decryption.

The storing of the specific contents as the mutual authenticated contents may include: verifying the requestor authentication information and the acceptor authentication information; when at least a part of the specific contents exists in a database storing an original provided in the social media service, generating server authentication representing that at least the part of the mutual authenticated contents is the original; and storing the specific contents adding the server authentication.

The storing of the specific contents as the mutual authenticated contents may include obtaining original contents corresponding to at least the part of the specific contents, and when a hash tree of groups configuring the specific contents includes a hash tree of groups configuring the original contents, proving at least the part of the specific contents as the original. The hash tree of the groups configuring the specific contents may be included in at least one of the requestor authentication information and the acceptor authentication information.

The requestor authentication information may further include authentication context information of the terminal of the requestor. The acceptor authentication information may further include authentication context information of the terminal of the acceptor.

The specific contents may be conversation contents selected in a chat room of an instant messaging application displayed on a screen of the terminal of the requestor.

The conversation contents selected in the chat room are local contents stored in the terminal of the requestor.

Another exemplary embodiment of the present disclosure provides a method of providing, by a terminal having an application of a social media service, mutual authentication for contents of the social media service in linkage with at least one server. The method includes: receiving a first message requesting mutual authentication for specific contents selected by a terminal of a requestor from the server; displaying the specific contents; when an authentication acceptance for the specific contents is entered, generating acceptor authentication information for the specific contents and transmitting a second message including the acceptor authentication information to the server; and receiving a mutual authentication result for the specific contents as a response to the second message from the server. The mutual authentication result may be generated by a verification of the acceptor authentication information and requestor authentication information generated in the terminal of the requestor. The requestor authentication information may include the specific contents and a signature of the requestor for the specific contents, and the acceptor authentication information includes the specific contents and a signature of the acceptor for the specific contents.

The displaying of the specific contents may include displaying the specific contents received from the server on an authentication acceptance screen.

The displaying of the specific contents may include extracting local contents corresponding to the specific contents in local data stored, and when the specific contents received from the server are the same as the local contents, displaying the specific contents on an authentication acceptance screen.

The method may further include, when the specific contents are different from the local contents, terminating the mutual authentication for the specific contents.

The displaying of the specific contents may include extracting local contents corresponding to the specific contents in local data stored, and when the specific contents received from the server are different from the local contents, displaying a different portion between the specific contents and the local contents on an authentication acceptance screen.

Another exemplary embodiment of the present disclosure provides a method of providing, by a server, mutual authentication to mutual authentication participants for conversation contents in a chat room of an instant messaging application. The method includes: receiving a mutual authentication request message requesting mutual authentication for conversation contents in a chat room to an acceptor, from a terminal of a requestor; transmitting a notification message of mutual authentication request for the conversation contents to a terminal of the acceptor; receiving a mutual authentication acceptance message for the conversation contents from the terminal of the acceptor; storing the conversation contents authenticated by each of the terminal of the requestor and the terminal of the acceptor through an electric signature as mutual authenticated contents of the requestor and the acceptor; and transmitting a mutual authentication result message for the conversation contents to the terminal of the requestor and the terminal of the acceptor. The mutual authentication request message may include the electronic signature of the requestor for the conversation contents of the chat room, and the mutual authentication acceptance message includes the electronic signature of the acceptor for the conversation contents of the chat room.

The transmitting of the notification message of mutual authentication request may include determining a participant of the chat room to which the conversation contents of the chat room are transmitted as the acceptor, or determining a user designated from the terminal of the requestor as the acceptor.

The conversation contents may be contents stored in the terminal of the requestor.

The receiving of the mutual authentication acceptance message may include when the conversation contents are identically stored in the terminal of the acceptor, receiving the mutual authentication acceptance message.

According to some embodiments of the present disclosure, users may easily mutually authenticate and store contents, such as conversation contents, exchanged online Also Users may manage and store the mutually authenticated contents so as to check the mutually authenticated contents anytime.

According to some embodiments of the present disclosure, it is possible to remove a possibility in that the conversation contents are forged/falsified by a specific user by mutually authenticating the contents, such as conversation contents, exchanged online. Therefore it may improve admissibility of evidence to the mutually authenticated contents.

According to some embodiments of the present disclosure, contents, such as contract contents, electronically signed by the contract parties may be used as a contract, and the contract parties may register the contract contents in a reliable notarization server or a reliable system, such as a block chain, and check the contract anytime anywhere while preventing the contract from being forged/falsified.

BRIEF DESCRIPTION OF THE DRAWINGS

FIG. 1 is a block diagram of a system according to an exemplary embodiment.

DETAILED DESCRIPTION OF THE EMBODIMENTS

Figure 2:
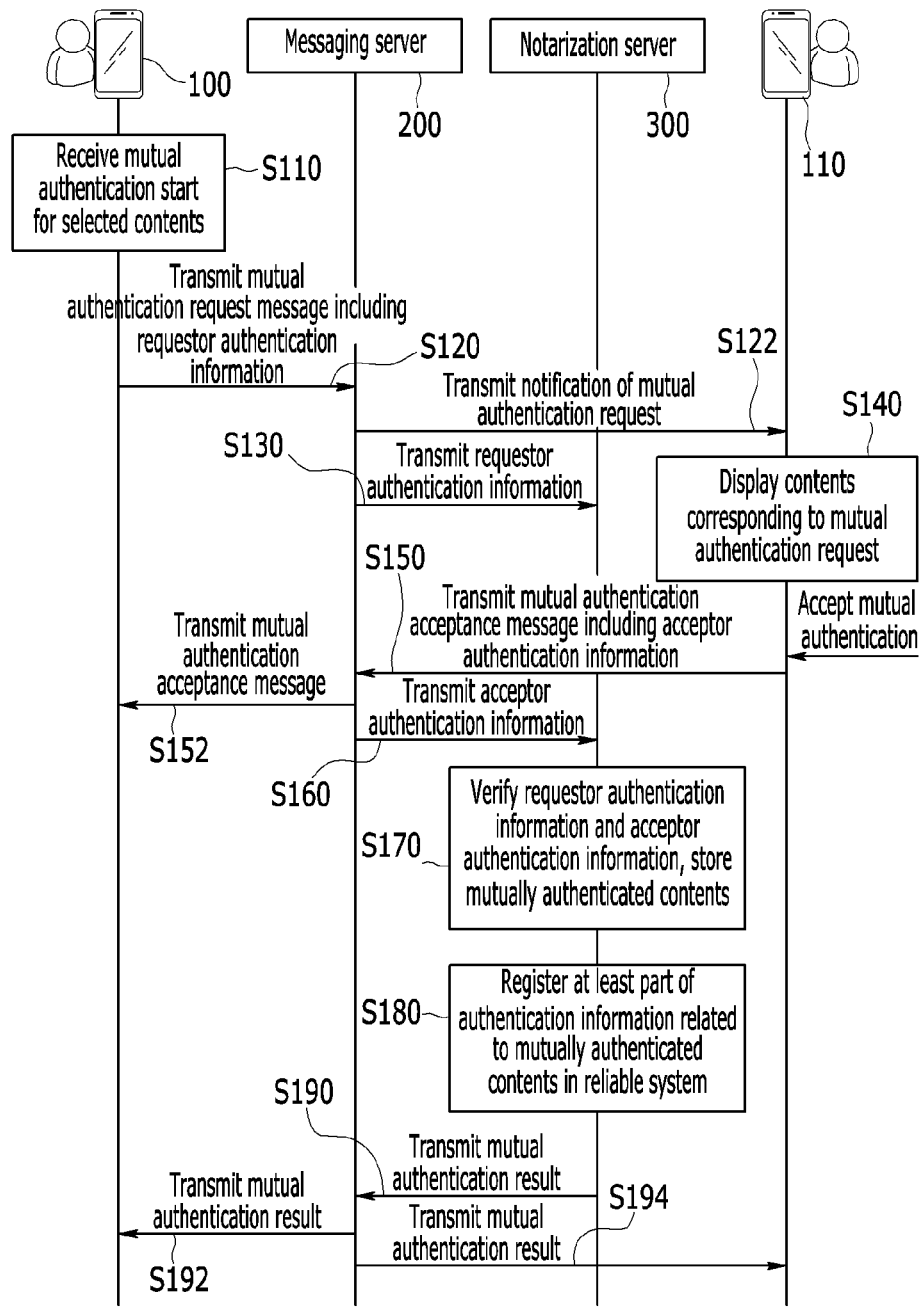
FIG. 2 and FIG. 3 are flowcharts of a mutual authenticating method according to an exemplary embodiment.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

A terminal includes an application that is software stored in a computer readable storage medium, and hardware, such as a processor, a memory, a display, and a communication module. The processor operates the application in cooperation with hardware. A display may display a user interface screen provided by the application, and receive a user input, for example, a touch input. A communication module connects to a server and communicates with the server through a communication network. The application includes commands executing an operation of the present disclosure.

A terminal may be implemented in various forms, and the terminal is described based on a mobile terminal as an example, but may be implemented in the form of a pad-type terminal, such as a smart pad, various forms of computer, such as a laptop computer, a wearable device, a TV terminal, and the like.

A social media service is described mainly based on an instant messaging service using an instant messaging application as an example, but the present disclosure is applicable to various social media services in which users may select contents desired to be mutually authenticated. Mutually authenticated contents may not be limited to messages exchanged with friends in a chat room. Mutually authenticated contents may be enough to contents posted by at least one user online, and the plurality of users may mutually authenticate and store the contents posted online. Further, the contents may be unstructured contents, such as messages or posts, and may be a specific form of contents, such as a contract, a power of attorney, and a promissory note, provided by an application.

A mutual authentication may be referred in other terms, for example, a mutual certification, or a mutual authorization.

FIG. 1 is a block diagram of a system according to an exemplary embodiment.

Referring to FIG. 1, terminals 100 and 110, in which a social media application is installed, access a server 200 and use functions provided by the social media application.

As the social media application, an instant messaging application is described as an example, and the server 200 refers to a messaging server. The instant messaging application is a program which provides an interface screen for opening a chat room and exchanging, by participants, messages in the chat room, and provides a mutual authentication service of conversation contents as described in the present disclosure. The instant messaging application displays an interface screen, in which users conveniently mutually authenticate conversation contents, in the terminals.

The contents mutually authenticated by users may be contents displayed on the terminal through the social media application or stored in the server. For description, it is assumed that conversation contents including messages provided in the instant messaging application are subject to mutual authentication and are generated to mutually authenticated contents.

Authentication information that each of the users authenticates specific conversation contents is transmitted to a notarization server 300. The notarization server 300 may be referred in other terms, for example, an authentication server, an authorization server or a certification server. The authentication information is transmitted from the user terminals 100 and 110 to the notarization server 300. It may be designed that the authentication information may be transmitted to the notarization server 300 via the messaging server 200 like (a), or the authentication information may be transmitted to the notarization server 300 by the user terminals 100 and 110 like (b).

For description, it is assumed that Aiden has terminal A 100 and Brian has terminal B 110, and Aiden and Brian exchange messages in a chat room, and Aiden is a requestor requesting mutual authentication for at least a part of the conversation contents in the chat room and Brian is an acceptor. A requestor and an acceptor are called mutual authentication participants. When the number of participants in the chat room is three or more, the number of acceptors may increase. The number of mutual authentication participants may be smaller than the number of participants in the chat room. That is, only the participants who need to mutually authenticate the conversation contents in the chat room may mutually authenticate the conversation contents. The mutual authentication requestor may select an acceptor, but the participants in the chat room may be automatically determined as the acceptors.

A notification message notifying the mutual authentication request may be displayed in the form of a message sent by a requestor in the chat room in which conversation contents to be mutually authenticated are displayed. In the meantime, only some of participants in the chat room may involve the mutual authentication, so that the notification message may be displayed in different chat room opened by the requestor and each acceptor for the mutual authentication. Otherwise, a virtual friend for mutual authentication (for example, a virtual friend or official account in "KakaoTalk" application or "Line" application) may transmit the notification message to the acceptor.

The mutual authentication service may be provided in various reliability levels, and in the description, the mutual authentication of a second level and a third level will be mainly described.

For example, referring to the mutual authentication of the first level, a requestor transmits mutual authentication contents to an acceptor, and then when the acceptor accepts the authentication of the received mutual authentication contents, the contents are mutually authenticated. The acceptor checks and accepts the requested mutual authentication contents, and for example, Aiden selects the messages including contract contents as mutual authentication contents and then requests Brian the mutual authentication in the chat room. Then, Brian may check the requested mutual authentication contents and then accept the mutual authentication contents. Otherwise, when Aiden writes a contract in the chat room and then requests the mutual authentication for the contract to Brian, Brian may check the received contract and then accept the contract.

Referring to the mutual authentication of the second level, when mutual authentication contents selected by a requestor are identically stored in the terminals of the mutual authentication participants, the mutual authentication contents selected may be mutually authenticated. When the mutual authentication contents are conversation contents, it is difficult for the acceptor to check whether the messages included in the mutual authentication contents are forged/falsified or deleted. Accordingly, the terminal of the acceptor determines whether the requested mutual authentication contents are the same as the conversation contents kept by himself/herself. And if the requested mutual authentication contents are not the same as the conversation contents, the acceptor may not proceed the mutual authentication any more. Otherwise, if the acceptor may also delete the conversation contents, the terminal of the acceptor notifies that the mutual authentication contents are not the same as the kept conversation contents, and may ask the acceptor to continuously proceed the mutual authentication. For example, the conversation contents displayed in the chat room of terminal A 100 may be selected as the mutual authentication contents, and the selected conversation contents may be transmitted to terminal B 110. In this case, terminal B 110 may extract the conversation contents, which are being stored by terminal B 110, in response to the conversation contents for which the mutual authentication is requested, and compare whether the conversation contents for which the mutual authentication is requested is the same as the stored conversation contents. The requestor may delete some messages in the original conversation contents or falsify the message contents and then ask the mutual authentication to the acceptor Therefore verification of identity between locally stored data and requested data may be required. A method of verifying identity may be various. Messages may be compared one by one or hash values of consecutive messages may be compared. That is, a hash value of the conversation contents for which the mutual authentication is requested may be compared with a hash value of conversation contents stored in a terminal of an acceptor. In this case, the hash values are the hash values of the messages sequentially continued from the first message to the last message of the conversation contents, so that when the message is missing or forged in the middle, the hash value may be different.

Referring to the mutual authentication of the third level, when the mutual authentication contents selected by a requestor are identically stored in the terminals of the mutual authentication participants and are also identically stored in the messaging server, the conversation contents are mutually authenticated. Even in the case of the mutual authentication of the second level, the mutual authentication participants may agree to erase or falsify a specific message, so that the mutual authentication of the second level may be considered as incomplete agreement. For the mutual authentication of a higher level, the server may prove that there has been no forgery on the entirety or at least a part of the mutual authentication contents.

The mutual authentication contents may include data that may identify who posted or transmitted what and when. If the conversation contents in the chat room are subjected to the mutual authentication, the mutual authentication contents are formed of identification information of each of the included messages. The identification information may include, for example, a chat room identifier, a message inputting person, a message contents (for example, text, an image, and URL), a message type (for example, text and scrape), and a message input time. The mutual authentication contents may be extracted in a specific format, such as a JSON format. An example of the JSON format is represented in Table 1.

TABLE 1

{
    "mgs": "message content",
    "type":"text"
    "created_at": message input time,
    "from": message inputting person,
    "to": chat room identifier
}

In the meantime, the mutual authentication contents may be transmitted in the form of an image obtained by capturing the conversation contents in the chat room.

The mutual authentication contents may be selected in original data stored in the messaging server 200, or may be selected in the contents stored in the terminal of the mutual authentication requestor. When the conversation contents displayed in the chat room are selected as the mutual authentication contents, terminal A 100 may extract and transmit the conversation contents in the JSON format.

In the meantime, terminal A 100 may transmit identification information (for example, identification information about the first message and the last message of the mutual authentication) through which the messaging server 200 or terminal B 110 may directly extract the conversation contents selected as the mutual authentication contents and a hash value of the selected conversation contents, instead of transmitting all of the selected conversation contents. In this case, the messaging server 200 may extract the original data corresponding to the identification information to allow the users to mutually authenticate the original data which is not forged/falsified. Otherwise, terminal B 110 may extract the conversation contents corresponding to the received identification information in the local data (that is, the conversation contents displayed in the chat room of terminal B 110), compare a hash value of the conversation contents selected in terminal A 100 with a hash value of the conversation contents extracted in the local data, and perform the mutual authentication of the second level. For convenience of the description, it is assumed that terminal A 100 transmits the selected conversation contents to the messaging server 200 and the messaging server 200 transmits the conversation contents to terminal B 110. Instead, The transmitted data may be the conversation contents in the JSON format and/or the identification information based on which the conversation contents may be extracted.

The messaging server 200 may store the original messages input by Aiden and Brian in the chat room in chat log database. The messages stored in the chat log database are original data of the conversation contents displayed in the chat room. When a start of the mutual authentication is requested, the messaging server 200 may provide the original data of the conversation contents to the terminal of the requestor to enable the requestor to select the mutual authentication contents in the original data. The original data may be used for verification of forgery/falsification of the mutual authentication contents selected in the terminal of the requestor or server authentication.

The notarization server 300 verifies the authentication information transmitted from the terminals of the mutual authentication participants, and then stores the verified contents as the mutually authenticated contents. The authentication information includes electronically signed information about the mutual authentication contents. The notarization server 300 verifies whether each of the mutual authentication participants authenticates the same contents based on the received authentication information. The notarization server 300 may verify the authentication information received through various authentication technologies, and verify, for example, the authentication information received by using a public key and private key (or a secret key)-based decryption and encryption technology (which is also called an electronic signature).

Linkage between the user terminals 100 and 110, the messaging server 200, and the notarization server 300 may be variously designed. For example, the notarization server 300 may receive the authentication information transmitted from the terminals of the mutual authentication participants or transmit a mutual authentication result to the terminals of the mutual authentication participants through the messaging server 200 like (a).

Otherwise, the notarization server 300 may receive the authentication information transmitted from the terminals of the mutual authentication participants or transmit a mutual authentication result to the terminals of the mutual authentication participants like (b).

The information included in the authentication information may be variously determined. For example, the authentication information may include the mutual authentication contents, a signature value obtained by encrypting, by each of the mutual authentication participants, the hash value of the mutual authentication contents with his/her private key, and a public key making a pair with the private key of each of the mutual authentication participants. In the meantime, the public key of each of the mutual authentication participants may be transmitted whenever the mutual authentication is requested, or may be registered in the notarization server 300 in advance.

The authentication information may further include authentication context information, such as a time, in which each of the mutual authentication participants authenticates the mutual authentication contents. In this case, the signature value may be a value obtained by signing the hash value of the mutual authentication contents and a hash value of the authentication context information with the private key. The authentication context information may include context, such as an authentication time and information on a terminal in which an authentication procedure is executed. The authentication context information may further include personal authentication information, such as bio authentication information.

The notarization server 300 decrypts the signature value with the public key of the corresponding mutual authentication participant and extracts the hash value. The notarization server 300 compares the mutual authentication contents included in the authentication information transmitted by the corresponding mutual authentication participant or the mutual authentication contents with the hash value of the authentication context information. Through the comparison, the notarization server 300 may determine the identify that the mutual authentication participant transmits the mutual authentication contents.

The notarization server 300 may determine the identity of the mutual authentication contents received from the respective mutual authentication participants, and determine the contents that the respective mutual authentication participants authenticate the same mutual authentication contents. The notarization server 300 may compare the hash values of the mutual authentication contents and simply determine whether the mutual authentication contents are the same.

A method of storing and reading the mutually authenticated contents may be various.

When only the mutual authentication participants are allowed to read the contents for which the mutual authentication is completed, the notarization server 300 may encrypt the mutually authenticated contents with the public key of each of the mutual authentication participants and store the contents for which the mutual authentication is completed. The mutually authenticated contents may be decrypted with the private key of each of the mutual authentication participants.

When even the users other than the mutual authentication participants are allowed to read the contents for which the mutual authentication is completed, the notarization server 300 may store the mutually authenticated contents without encrypting the mutually authenticated contents, or may encrypt the mutually authenticated contents with a symmetric key known by the notarization server 300 and store the encrypted contents.

When users designed by the mutual authentication participants or users satisfying a specific condition are allowed to read the mutually authenticated contents, the notarization server 300 may grant access authority for the mutually authenticated contents to the designated users, or determine whether the users requesting the mutually authenticated contents satisfy the specific condition and grant access authority.

The notarization server 300 may register at least a part of the authentication information in a reliable external system. The reliable external system may be a public block chain system formed of distribution nodes. For example, the notarization server 300 may register the hash value of the mutually authenticated contents, the authentication context information of the mutual authentication participants or the hash values thereof, and the signature values received from the mutual authentication participants in a block chain system.

Next, a mutual authenticating method will be described based on an example. The described mutual authenticating methods may be combined with each other to be implemented as a new mutual authenticating method.

Figure 3:
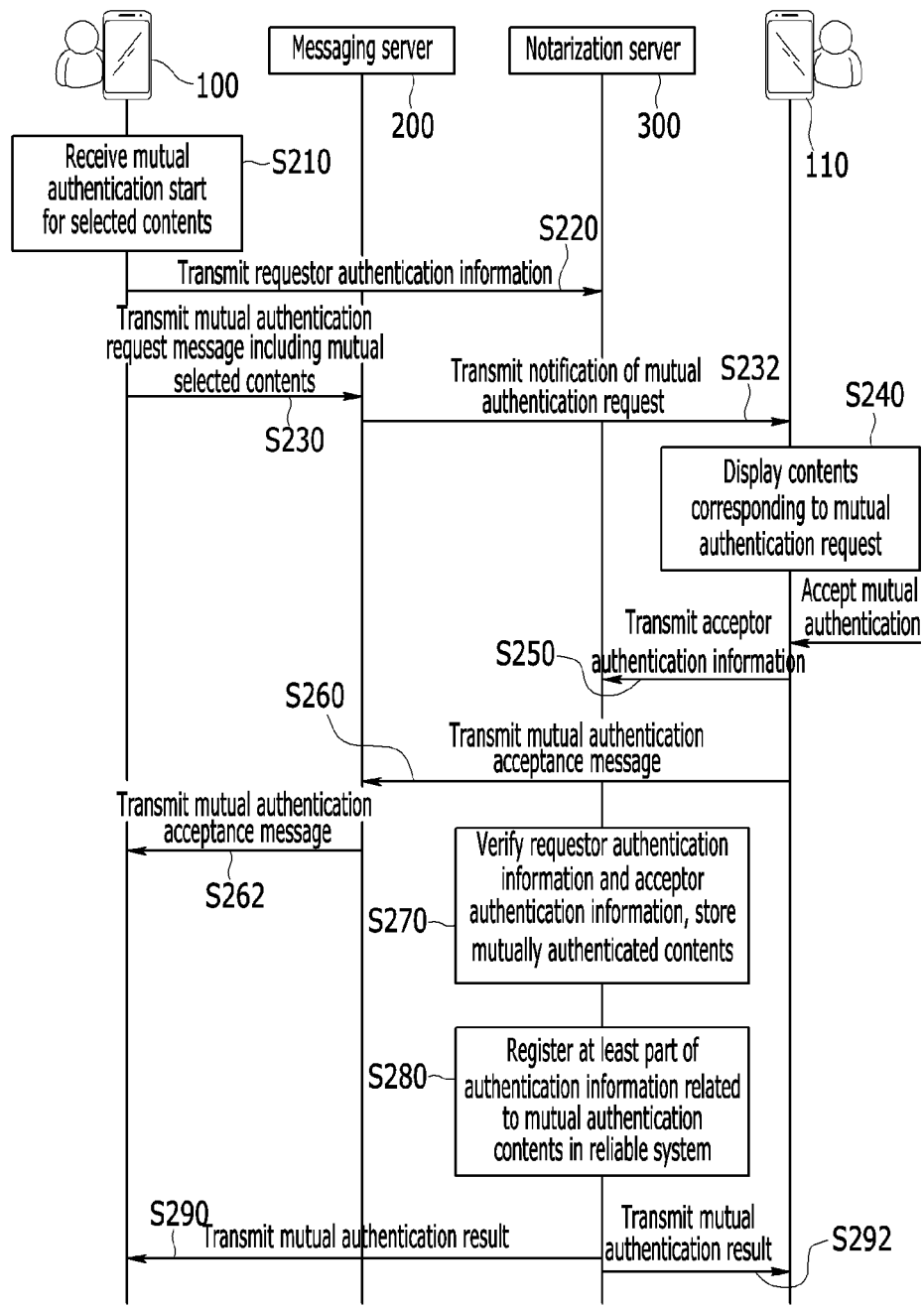

FIG. 2 and FIG. 3 are flowcharts of a mutual authenticating method according to an exemplary embodiment.

Referring to FIG. 2, terminal A 100 receives a start of mutual authentication for selected contents (S110). For example, when an instant messaging application provides a mutual authentication service for conversation contents in a chat room, terminal A 100 may display a selection screen in which the conversation contents in the chat room may be selected and then receive the mutual authentication start for the selected conversation contents. In this case, the method of selecting, by a requestor, the mutual authentication contents may be various. The mutual authentication contents may be selected in local data stored in terminal A 100 or may be selected in original data stored in the messaging server 200. When terminal A 100 enters a mutual authentication procedure in the chat room, terminal A 100 may display a selection screen in which at least a part of the conversation contents displayed in the chat room may be selected. The selection screen may be the screen of the chat room, the screen overlaid on the chat room, or a separate mutual authentication screen outside the chat room. For example, Aiden may select from message 1 to message 12 displayed on the selection screen as the mutual authentication contents.

Terminal A 100 generates requestor's authentication information (hereinafter, "requestor authentication information") of the mutual authentication contents and transmits a mutual authentication request message including the requestor authentication information to the messaging server 200 (S120). The requestor authentication information may include, for example, the contents selected for mutual authentication (the mutual authentication contents), authentication context information, such as an authentication time, a signature value obtained by encrypting a hash value of each of the mutual authentication contents and the authentication context information with a private key, and a public key making a pair with the private key.

The messaging server 200 transmits a notification message of mutual authentication request to terminal B 110 of a mutual authentication acceptor (S122). The mutual authentication acceptor may be automatically determined with participants in the chat room in which the mutual authentication contents are selected. Otherwise, the mutual authentication acceptor may be individually selected by the mutual authentication requestor, and in this case, mutual authentication acceptor information may be transmitted from terminal A 100 to the messaging server 200.

The notarization server 300 receives the requestor authentication information from terminal A 100 (S130). The messaging server 200 may transmit the requestor authentication information included in the mutual authentication request message of terminal A 100 to the notarization server 300. Otherwise, terminal A 100 may transmit the requestor authentication information to the notarization server 300.

Terminal B 110 receives the notification message of mutual authentication request from the messaging server 200, and displays the mutual authentication contents corresponding to the mutual authentication request (S140). The notification message of mutual authentication request may be displayed in the form of a message sent by the mutual authentication requestor or a virtual friend for mutual authentication friend to the acceptor. The mutual authentication contents may be included in the notification message of mutual authentication request and transmitted, or when the notification message of mutual authentication request is selected, the messaging server 200 may transmit the mutual authentication contents to terminal B 110. Terminal B 110 may display the mutual authentication contents received from the messaging server 200 on a mutual authentication screen that is discriminated from the chat room. For example, terminal B 110 may display the received mutual authentication contents on a higher layer of the chat room in the form of a web view, or switch the chat room to a mutual authentication screen and display the received mutual authentication contents. Terminal B 110 may display the received mutual authentication contents (for example, from message 1 to message 12) so that the acceptor can know. Otherwise, terminal B 110 may extract contents (local conversation contents) kept in terminal B 110 in response to the received mutual authentication contents (from message 1 to message 12) and compare whether the contents kept in terminal B 110 are the same as the received mutual authentication contents. When some messages of the local contents are deleted and the mutual authentication (from message 1 to message 12) are generated, or contents of some messages in the local contents are forged/falsified and the mutual authentication are generated, terminal B 110 may display that there is the deleted message between message 2 and message 3 of the mutual authentication contents or message 2 of the mutual authentication contents is the forged/falsified message. When the mutual authentication contents are not the same as the mutual authentication contents kept in terminal B 110, terminal B 110 may not proceed the mutual authentication any more. Otherwise, terminal B 110 may notify that mutual authentication contents are not the same as the local contents kept in terminal B 110, and ask the acceptor whether to continuously proceed the mutual authentication.

When terminal B 110 receives an authentication acceptance for the mutual authentication contents from Brian, terminal B 110 generates acceptor's authentication information (hereinafter, "acceptor authentication information") for the mutual authentication contents, and transmits a mutual authentication acceptance message including the acceptor authentication information to the messaging server 200 (S150). The acceptor authentication information may include, for example, the contents for mutual authentication, authentication context information, such as an authentication time, a signature value obtained by encrypting a hash value of each of the mutual authentication contents and the authentication context information with a private key, and a public key making a pair with the private key.

The messaging server 200 transmits the mutual authentication acceptance message to terminal A 100 of the mutual authentication requestor (S152).

The notarization server 300 receives the acceptor authentication information transmitted from terminal B 110 (S160). The messaging server 200 may transmit the acceptor authentication information included in the mutual authentication acceptance message of terminal B 200 to the notarization server 300. Otherwise, terminal B 110 may transmit the acceptance authentication information to the notarization server 300.

When the notarization server 300 verifies the requestor authentication information and the acceptor authentication information and then the verification is successful, the notarization server 300 stores the mutual authentication contents included in the requestor authentication information and the acceptor authentication information as mutually authenticated contents (S170).

The notarization server 300 may register at least a part of the authentication information related to the mutually authenticated contents in a reliable external system (for example, a block chain system) (S180). For example, the notarization server 300 may register the hash value of the mutually authenticated contents, the authentication context information included in the requestor authentication information and the acceptor authentication information or the hash values thereof, and the signature values included in the requestor authentication information and the acceptor authentication information in a block chain system.

The notarization server 300 transmits a mutual authentication result for the mutual authentication contents to the messaging server 200 (S190). The mutual authentication result includes a result in which the mutual authentication contents are stored as the mutually authenticated contents, and may further include address information for accessing the mutually authenticated contents. In the meantime, the notarization server 300 may transmit the mutual authentication result to terminal A 100 and terminal B 110.

The messaging server 200 transmits the mutual authentication result to terminal A 100 and terminal B 110 of the mutual authentication participants (S192 and S194).

Referring to FIG. 3, terminal A 100 receives a start of the mutual authentication for selected contents (S210).

Terminal A 100 generates requestor authentication information of the mutual authentication contents and transmits the generated requestor authentication information to the notarization server 300 (S220).

Terminal A 100 transmits a mutual authentication request message including the selected contents to the messaging server 200 (S230). For reference, orders of S220 and S230 may be changed, or the requestor authentication information and the mutual authentication request message may be transmitted at the same time.

The messaging server 200 transmits a notification message of mutual authentication request to terminal B 110 of a mutual authentication acceptor (S232).

Terminal B 110 receives the notification message of mutual authentication request from the messaging server 200, and displays mutual authentication contents corresponding to the mutual authentication request (S240).

When terminal B 110 receives an authentication acceptance for the mutual authentication contents from Brian, terminal B 110 generates acceptor authentication information for the mutual authentication contents, and transmits the generated acceptor authentication information to the notarization server 300 (S250).

Terminal B 110 transmits a mutual authentication acceptance message for the mutual authentication contents to the messaging server 200 (S260). For reference, orders of S250 and S260 may be changed, or the acceptor authentication information and the mutual authentication acceptance message may be transmitted at the same time.

The messaging server 200 transmits the mutual authentication acceptance message to terminal A 100 of the mutual authentication requestor (S262).

When the notarization server 300 verifies the requestor authentication information and the acceptor authentication information and then the verification is successful, the notarization server 300 stores the mutual authentication contents included in the requestor authentication information and the acceptor authentication information as mutually authenticated contents (S270).

The notarization server 300 may register at least a part of the authentication information related to the mutually authenticated contents in a reliable external system (for example, a block chain system) (S280).

The notarization server 300 transmits a mutual authentication result for the mutual authentication contents to terminal A 100 and terminal B 110 (S290 and S292). The mutual authentication result includes a result in which the mutual authentication contents are stored as the mutually authenticated contents, and may further include address information for accessing the mutually authenticated contents. In the meantime, the notarization server 300 may transmit the mutual authentication result to the messaging server 200.

Figure 4:
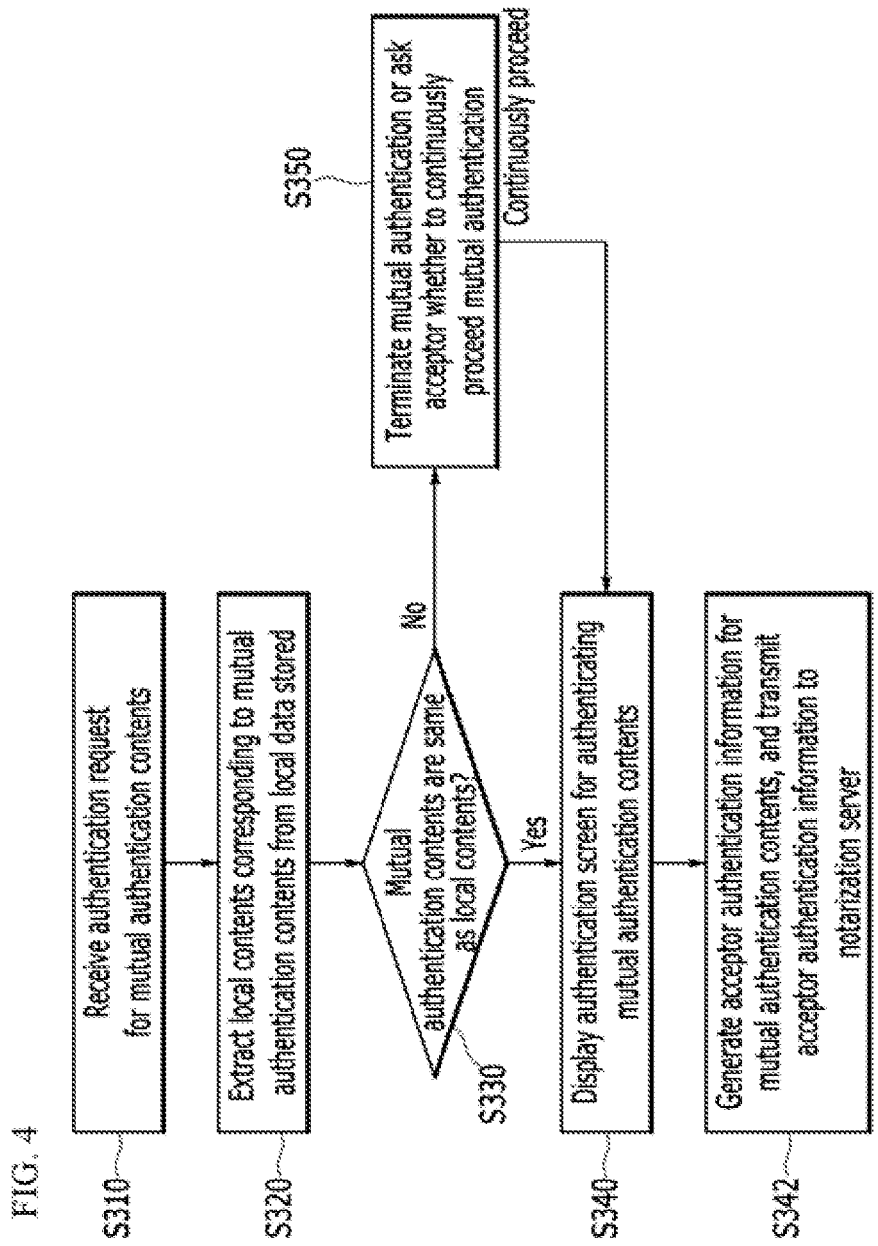
FIG. 4 and FIG. 5 are flowcharts of a mutual authenticating method proceeding in the case where mutual authentication participants store same contents according to the exemplary embodiment.
Figure 5:
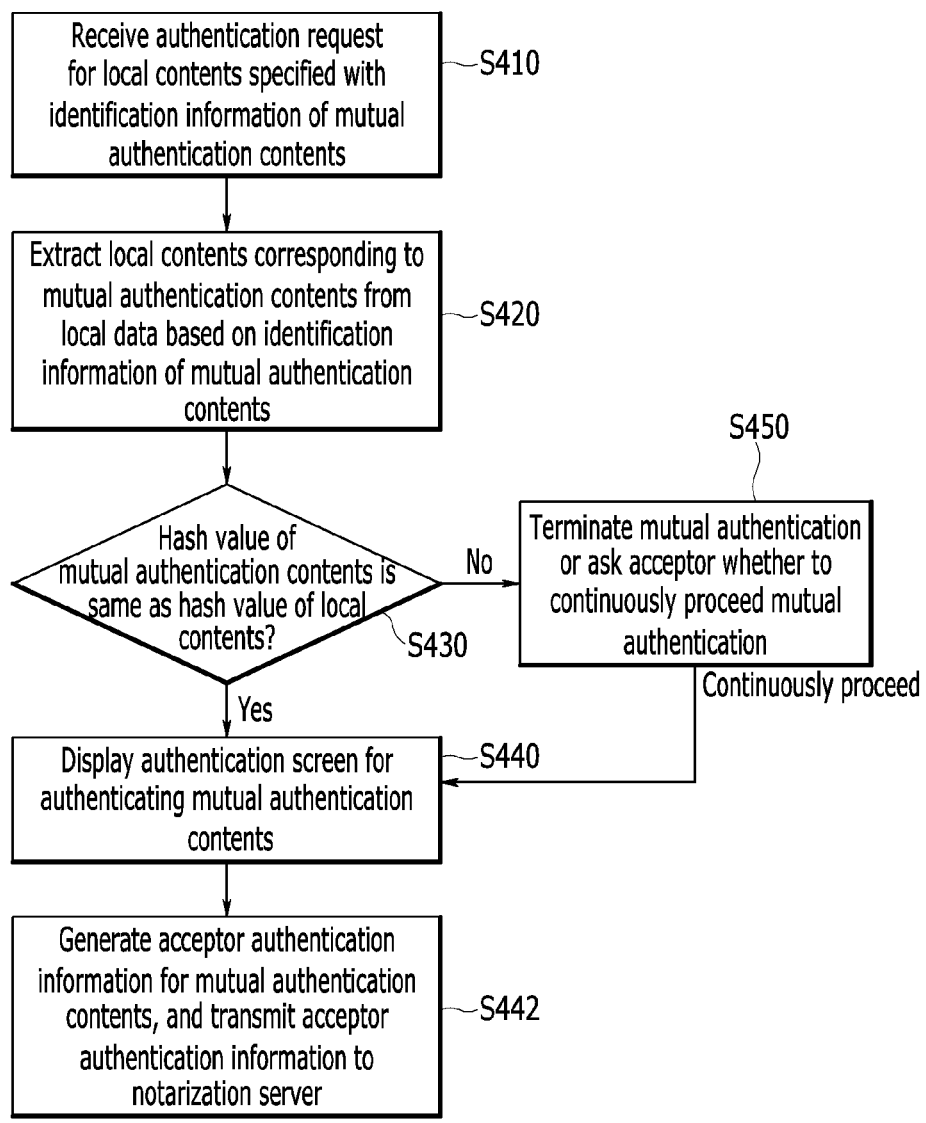

FIG. 4 and FIG. 5 are flowcharts of a mutual authenticating method proceeding in the case where mutual authentication participants store same contents according to the exemplary embodiment.

Referring to FIG. 4, when the messaging server 200 receives a mutual authentication request message for the mutual authentication contents from terminal A 100, the messaging server 200 transmits a notification message of mutual authentication request to terminal B 110 of a mutual authentication acceptor, and when the mutual authentication contents (from message 1 to message 12) are included in the mutual authentication request message, terminal B 110 may perform the mutual authentication as described below. In this case, the mutual authentication request message may further include a hash value of the mutual authentication contents.

Terminal B 110 of the mutual authentication acceptor receives an authentication request of the acceptor for the mutual authentication contents from the messaging server 200 (S310). The mutual authentication contents are designated object for the mutual authentication. When the messaging server 200 receives the mutual authentication request message for the mutual authentication contents from terminal A 100 of a mutual authentication requestor, the messaging server 200 requests the authentication of the acceptor from the mutual authentication acceptor. In this case, the mutual authentication request message may include the mutual authentication contents (from message 1 to message 12), and may further include a hash value of the mutual authentication contents.

Terminal B 110 extracts local contents corresponding to the received mutual authentication contents from local data stored (S320).

Terminal B 110 compares whether the mutual authentication contents are the same as the local contents (S330). Terminal B 110 may extract the corresponding local contents based on identification information included in the mutual authentication contents. The method of comparing whether the mutual authentication contents are the same as the local contents may be various. Terminal B 110 may sequentially compare the mutual authentication contents and the local contents from the first message included in each of the mutual authentication contents and the local contents. Otherwise, terminal B 110 may compare hash values included in the mutual authentication contents and the local contents. The hash values are the hash values of the messages sequentially continued from the first message to the last message of the conversation contents, so that when the message is missing or forged in the middle, the hash value may be different. That is, a hash value of the conversation contents for which the mutual authentication is requested may be compared with a hash value of conversation contents stored in the terminal of the acceptor in response to the conversation contents for which the mutual authentication is requested.

When the mutual authentication contents are the same as the local contents, terminal B 110 displays an authentication screen through which the acceptor may authenticate the mutual authentication contents (S340).

When terminal B 110 receives an authentication acceptance for the mutual authentication contents, terminal B 110 generates acceptor authentication information for the mutual authentication contents, and transmits the generated acceptor authentication information to the notarization server 300 (S342).

When the mutual authentication contents are different from the local contents, terminal B 110 terminates the mutual authentication or asks the acceptor whether to continuously proceed the mutual authentication (S350). In the case where terminal B 110 asks the acceptor whether to continuously proceed the mutual authentication, terminal B 110 may display so that the acceptor may know the difference between the mutual authentication contents and the local contents. For example, when some messages in the local contents are deleted and the mutual authentication (from message 1 to message 12) are generated, or contents of some messages in the local contents are forged/falsified and the mutual authentication are generated, terminal B 110 may display that there is the deleted message between message 2 and message 3 of the mutual authentication contents or message 2 of the mutual authentication contents is the forged/falsified message.

When terminal B 110 receives the mutual authentication continuous proceeding, terminal B 110 may display the authentication screen of operation S340 and continue the mutual authentication process.

Referring to FIG. 5, when the messaging server 200 receives a mutual authentication request message for the mutual authentication contents from terminal A 100, the messaging server 200 transmits a notification message of mutual authentication request to terminal B 110 of a mutual authentication acceptor, and when identification information about the mutual authentication contents are included in the mutual authentication request message, terminal B 110 may perform the mutual authentication as described below. The identification information about the mutual authentication contents are the information which are capable of specifying the mutual authentication contents, and may include, for example, identification about two messages which are capable of specifying the first message and the last message of the mutual authentication contents and the hash value of the mutual authentication contents. For example, in the case of the JSON format represented in Table 1, the identification information includes a message input time, a message inputting person, a chat room identifier together with the message contents. Accordingly, the mutual authentication contents formed of the consecutive messages may be specified with the identification information about the first message and the last message, and the hash values of the consecutive messages.

Terminal B 110 of the mutual authentication acceptor receives an authentication request for the local contents specified by the identification information of the mutual authentication contents from the messaging server 200 (S410).

Terminal B 110 extracts the local contents corresponding to the mutual authentication contents in kept local data based on the received identification information of the mutual authentication contents (S420).

Terminal B 110 compares whether the hash value of the mutual authentication contents is the same as a hash value of the local contents (S430).

When the hash value of the mutual authentication contents is the same as the hash value of the local contents, terminal B 110 displays a screen through which the acceptor may authenticate the mutual authentication contents (S440).

When terminal B 110 receives an authentication acceptance for the mutual authentication contents, terminal B 110 generates acceptor authentication information for the mutual authentication contents, and transmits the generated acceptor authentication information to the notarization server 300 (S442).

When the hash value of the mutual authentication contents is different from the hash value of the local contents, terminal B 110 terminates the mutual authentication or asks the acceptor whether to continuously proceed the mutual authentication (S450).

When terminal B 110 receives the mutual authentication continuous proceeding, terminal B 110 may display the authentication screen of operation S440 and proceed the mutual authentication.

Figure 6:
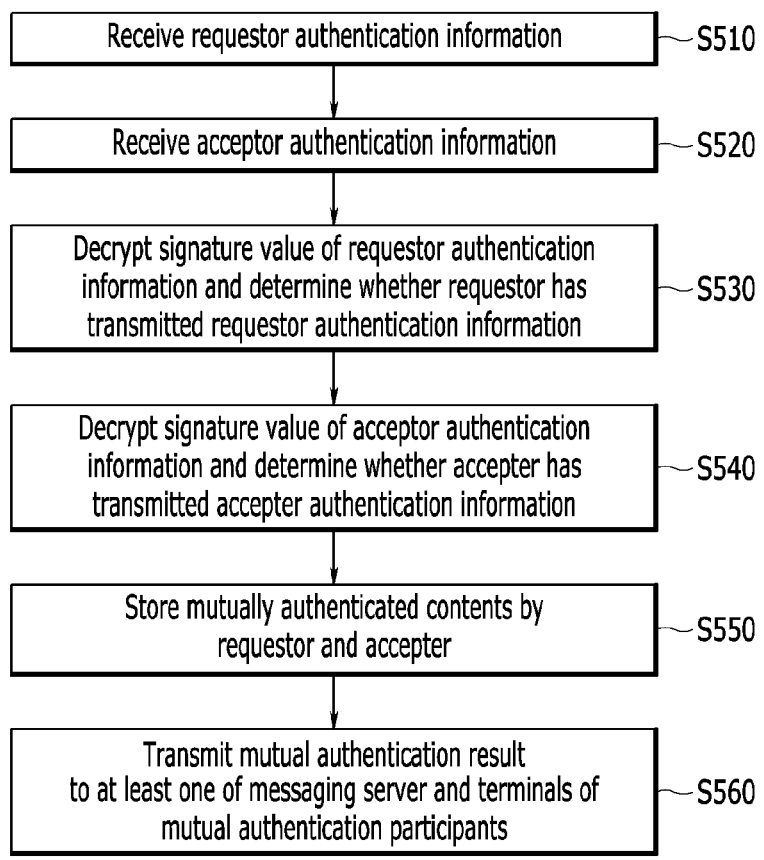
FIG. 6 is a flowchart of an operation method of a notarization server according to the exemplary embodiment.

FIG. 6 is a flowchart of an operation method of the notarization server according to the exemplary embodiment.

Referring to FIG. 6, the notarization server 300 receives the requestor authentication information and the acceptor authentication information (S510 and S520). Each of the requestor authentication information and the acceptor authentication information may include the mutual authentication contents and an electronic signature for the mutual authentication contents. Particularly, the requestor authentication information may include the mutual authentication contents (data), authentication context information (Context (A)) of the requestor, such as an authentication time, a signature value (Sig( )) obtained by encrypting a hash value (H[Data]) of the mutual authentication contents and a hash value (H[Context(A)]) of the authentication context information with a private key ([Key1(A)]), and a public key ([Key2(A)]) of the requestor making a pair with the private key, as represented in Table 2. Particularly, the acceptor authentication information may include the mutual authentication contents (data), authentication context information (Context(B)) of the acceptor, such as an authentication time, a signature value (Sig( )) obtained by encrypting a hash value (H[Data]) of the mutual authentication contents and a hash value (H[Context(B)]) of the authentication context information with a private key ([Key1(B)]), and a public key ([Key2(B)]) of the acceptor making a pair with the private key, as represented in Table 2. In the meantime, the authentication context information, the hash value of the authentication context information, and the public key may not be included in the requestor authentication information and the acceptor authentication information.

TABLE 2

|  | Requestor authentication information | Acceptor authentication information |
| --- | --- | --- |
| Mutual authentication Contents | Data | Data |
| Authentication context information | Context(A) | Context(B) |
| Signature value | Sig (Key 1(A), H[Data] + H[Context(A)]) | Sig (Key 1(B), H[Data] + H[Context(B)]) |
| Public key | Key2(A) | Key2(B) |

The notarization server 300 decrypts the signature value of the requestor authentication information by using the public key of the requestor, and determines whether the requestor has transmitted the requestor authentication information based on a result of the decryption (S530). When the value obtained by decrypting the signature value of the requestor authentication information is the same as the hash values of the mutual authentication contents and the authentication context information included in the requestor authentication information, the notarization server 300 may determine that the requestor has transmitted the authentication context information and the mutual authentication contents included in the requestor authentication information.

Similarly, the notarization server 300 decrypts the signature value of the acceptor authentication information by using the public key of the acceptor, and determines whether the acceptor has transmitted the acceptor authentication information based on a result of the decryption (S540). When the value obtained by decrypting the signature value of the acceptor authentication information is the same as the hash values of the mutual authentication contents and the authentication context information included in the acceptor authentication information, the notarization server 300 may determine that the acceptor has transmitted the authentication context information and the mutual authentication contents included in the acceptor authentication information.

The notarization server 300 stores the mutual authentication contents authenticated by the requestor and the acceptor as mutually authenticated contents (S550). When the mutual authentication contents included in the requestor authentication information are the same as the mutual authentication contents included in the acceptor authentication information, the notarization server 300 stores the same mutual authentication contents as the contents for which the mutual authentication is completed by the requestor and the acceptor. The notarization server 300 may compare the hash values of the mutual authentication contents and determines whether the mutual authentication contents are the same. The notarization server 300 may register at least a part of the authentication information related to the mutually authenticated contents in a reliable external system (for example, a block chain system).

The notarization server 300 may transmit a mutual authentication result to at least one of the messaging server 200, terminal A 100, and terminal B 110 (S560). The mutual authentication result includes a result in which the mutual authentication contents are stored as the mutually authenticated contents, and may further include address information for accessing the mutually authenticated contents.

In the meantime, the notarization server 300 may encrypt the mutually authenticated contents with the public key of each of the mutual authentication participants and store the mutually authenticated contents so that only the mutual authentication participants are allowed to read the mutually authenticated contents. The notarization server 300 may store the mutually authenticated contents without encrypting the mutually authenticated contents or may encrypt the mutually authenticated contents through a symmetric key known by the notarization server 300 and store the mutually authenticated contents so that users other than the mutual authentication participants are also allowed to read the mutually authenticated contents. The notarization server 300 may grant access authority for the mutually authenticated contents to designated users, or determine whether users requesting the mutually authenticated contents satisfy a specific condition and grant access authority so that the users designed by the mutual authentication participants or the users satisfying the specific condition are allowed to read the mutually authenticated contents.

Figure 7:
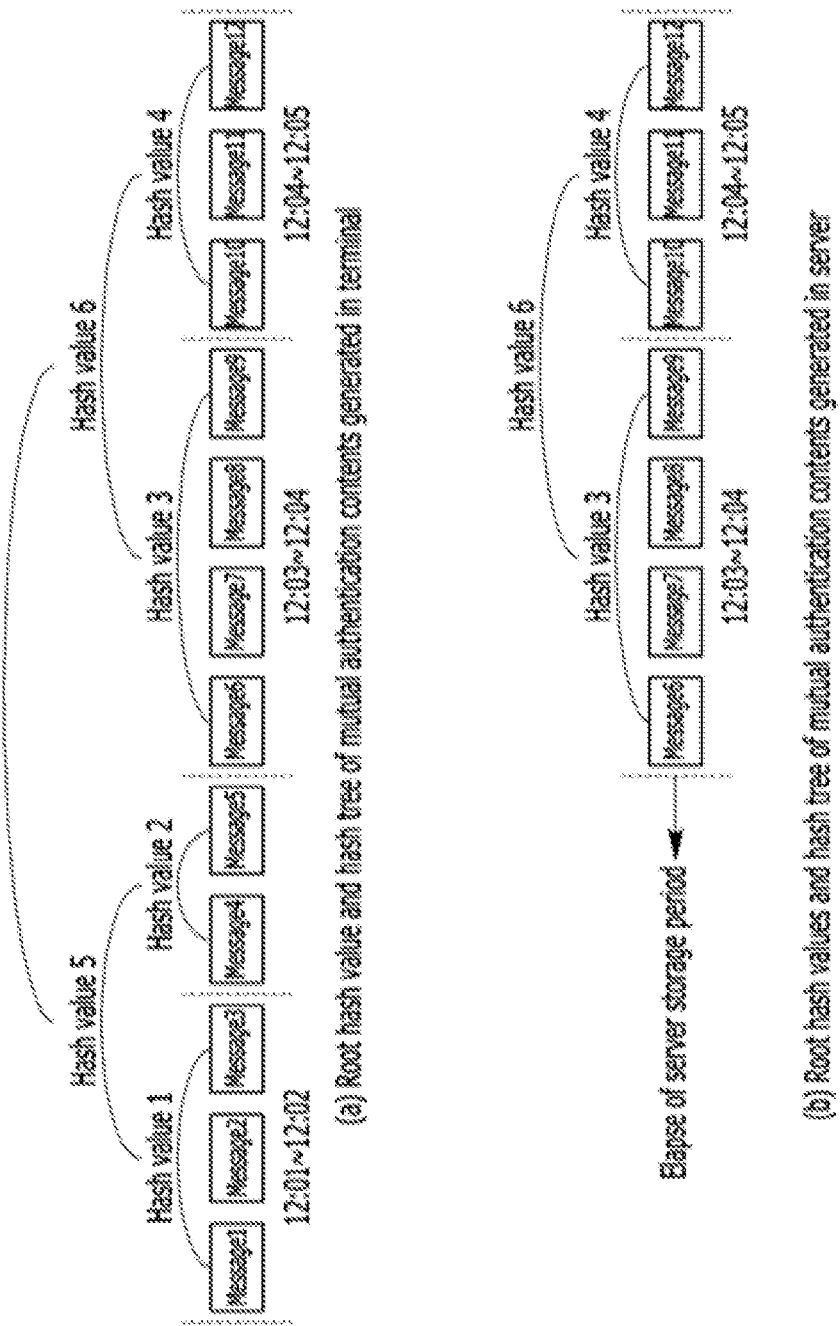
FIG. 7 is a diagram describing additional authentication of the notarization server according to the exemplary embodiment.

FIG. 7 is a diagram describing additional authentication of the notarization server according to the exemplary embodiment.

Referring to FIG. 7, the notarization server 300 may verify whether the mutual authentication contents are forged/falsified and increase mutual authentication reliability (the mutual authentication of the third level). Even though the mutual authentication contents are identically stored in the terminals of the mutual authentication participants, the mutual authentication participants may agree to delete a specific message and falsify the mutual authentication contents. Accordingly, the notarization server 300 may additionally authenticate the entirety or at least a part of the mutual authentication contents based on server data stored in the server in response to the mutual authentication contents.

When the notarization server 300 additionally authenticates the conversation contents, the notarization server 300 extracts original data of the conversation contents displayed in the chat room from a chat log database, and additionally authenticates the entirety or at least a part of the mutual authentication contents based on the original data. The notarization server 300 may directly extract necessary original data from the chat log database or obtain necessary original data through the messaging server 200 managing the chat log database. Otherwise, the notarization server 300 may receive the original data of the conversation contents from the messaging server 200, and receive a request for the mutual authentication of the third level for the original data of the conversation contents. The chat log database may store all of the conversation contents displayed in the chat room, but may not store the conversation contents past a certain amount of time. Accordingly, the notarization server 300 additionally authenticates the entirety or at least a part of the mutual authentication contents by using the original data stored in the chat log database.

The mutual authentication of the third level at which the notarization server 300 additionally authenticates the mutual authentication contents additionally includes a procedure of checking whether the mutual authentication contents identically stored by the requestor and the acceptor are also stored in the server in the mutual authentication of the second level.

To this end, terminal A 100 of the requestor and terminal B 110 of the acceptor transmit the requestor authentication information and the acceptor authentication information including the mutual authentication contents and the like to the notarization server 300, respectively, and additionally transmit hash trees of the groups configuring the mutual authentication contents and hash values (root hash values) of the top nodes (root nodes) of the hash trees. In the meantime, the root has value and the hash tree of the mutual authentication contents may also be included at least one of the requestor authentication information and the acceptor authentication information.

Referring to (a) of FIG. 7, when terminal A 100 transmits a root hash value and a hash tree of the mutual authentication contents (from message 1 to message 12), terminal A 100 groups the consecutive messages configuring the mutual authentication contents and calculates the root hash value while sequentially hashing the hash values of the adjacent groups connected with the hash tree. A grouping reference may be variously set, such as a time unit and the number of messages, but when the original data is deleted from the messaging server 200 after a certain amount of time elapses, terminal A 100 may segment the messages based on a time unit (for example, a unit of one minute) and generate a group so that terminal A 100 and the notarization server 300 are allowed to identically generate the group.

The notarization server 300 acquires original contents corresponding to the mutual authentication contents. The notarization server 300 may acquire original contents corresponding to the mutual authentication contents based on the identification information included in the mutual authentication contents. The original contents may be kept in the chat log database, and when the mutual authentication time is within a server storage period of the original contents, the notarization server 300 may acquire original contents corresponding to the mutual authentication contents.

Referring to (b) of FIG. 7, according to a mutual authentication time, only a part of the mutual authentication contents may be stored in the chat log database. Then, the notarization server 300 may acquire original contents corresponding to the part of the mutual authentication contents. The notarization server 300 groups the consecutive messages configuring the original contents based on the grouping reference (for example, the unit of one minute), and calculate a root hash value while sequentially hashing the hash values of the adjacent groups connected with the hash tree.

When the root hash value (for example, hash value 6) of the original contents is included in the hash tree transmitted from terminal A 100, the notarization server 300 additionally authenticates that the messages (from message 6 to message 12) corresponding to the original contents in the mutual authentication contents are identically stored in the terminal and the server.

Figure 8:
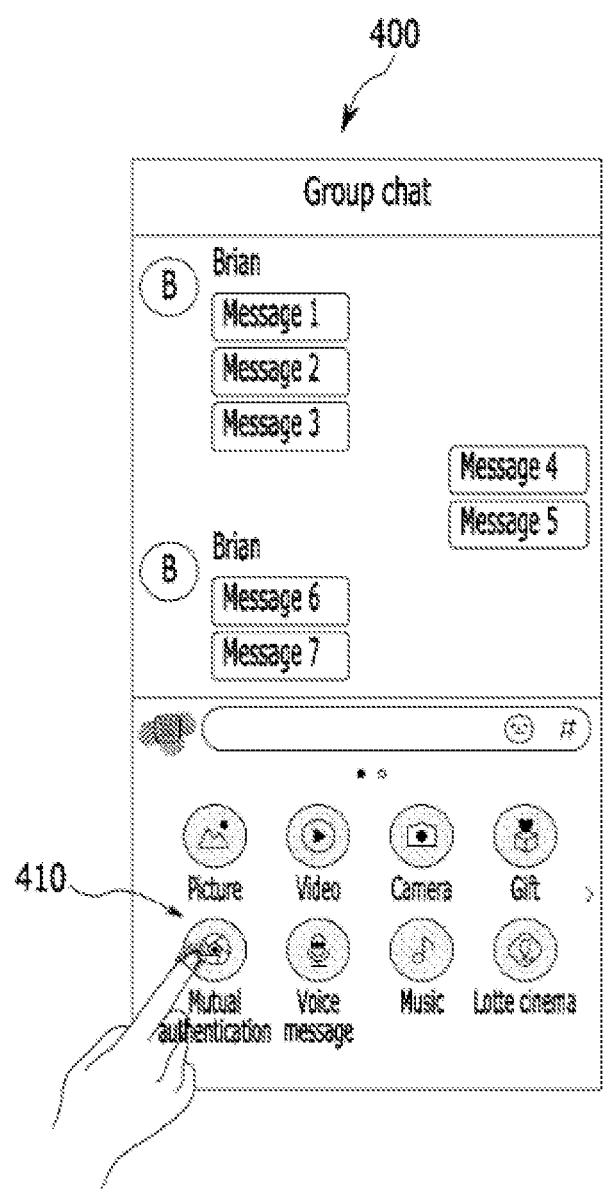
FIG. 8 is an example of an interface screen for entering a mutual authentication service according to the exemplary embodiment.

FIG. 8 is an example of an interface screen for entering a mutual authentication service according to the exemplary embodiment.

Referring to FIG. 8, an interface screen 400 of terminal A 100 provides a menu item allowing Aiden to enter the mutual authentication service in the chat room. For example, the interface screen may include a mutual authentication service (provisional name) menu item 410 in an additional service menu provided in the chat room. Aiden may select the mutual authentication service menu item 410 and start a mutual authentication procedure.

In addition, Aiden may select a message to be mutually authenticated with a designed operation (for example, long touch on the message) and start the mutual authentication procedure.

Figure 9:
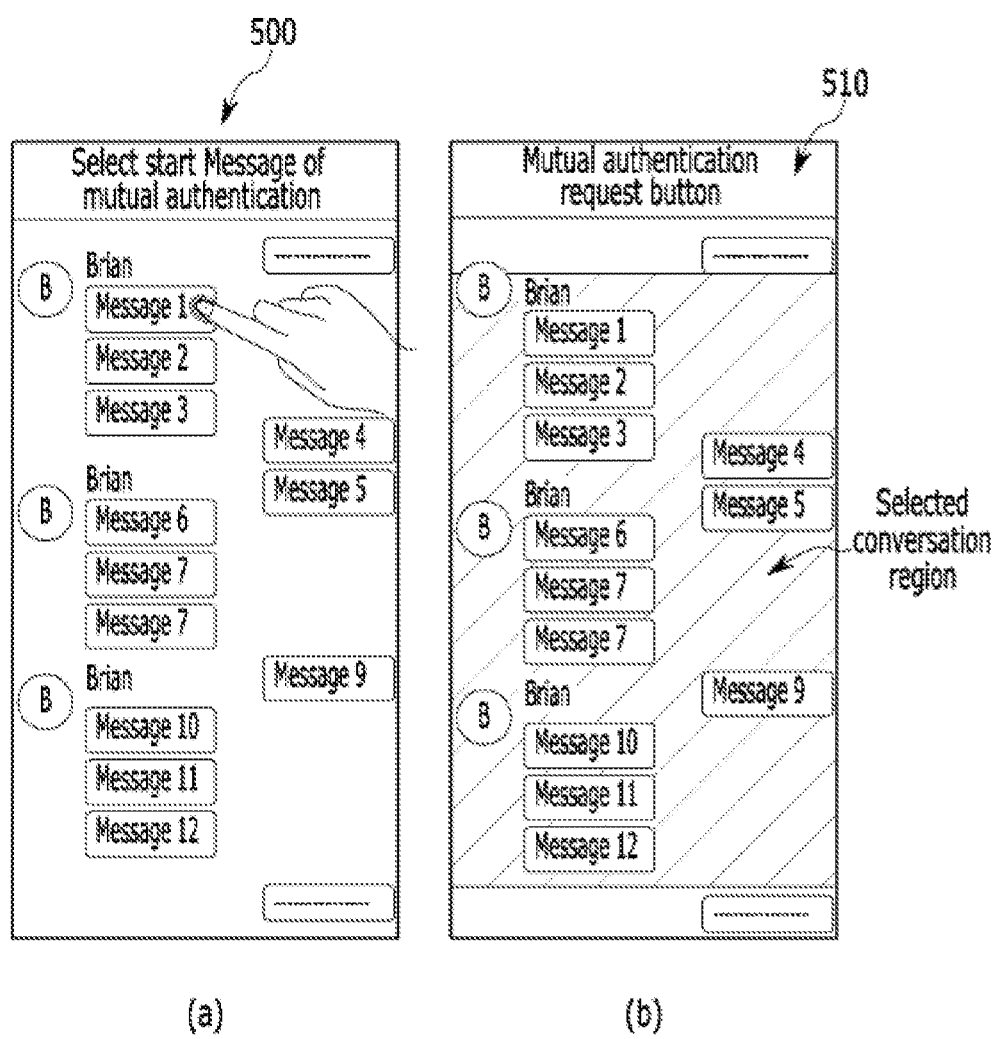
FIG. 9 is an example of a user interface screen through which mutually authenticated contents are selected according to the exemplary embodiment.

FIG. 9 is an example of a user interface screen through which mutually authenticated contents are selected according to the exemplary embodiment.

Referring (a) of FIG. 9, an interface screen 500 of terminal A 100 displays a selection screen through which conversation contents of the chat room are selectable, and requests a selection of mutual authentication contents. For example, the interface screen 500 may request a selection of the first message of the mutual authentication contents, and then request a selection of the last message.

Referring to (b) of FIG. 9, Aiden selects a partial conversation region (from message 1 to message 12) in the interface screen 500. When Aiden selects a mutual authentication request button 510 after selecting the mutual authentication contents, terminal A 100 generates requestor authentication information for the mutual authentication contents and transmits the requestor authentication information to the notarization server 300 directly or through the messaging server 200. Then, terminal A 100 transmits a mutual authentication request message including the mutual authentication contents to the messaging server 200. Herein, the requestor authentication information may be transmitted to the messaging server 200 while being included in the mutual authentication request message.

Figure 10:
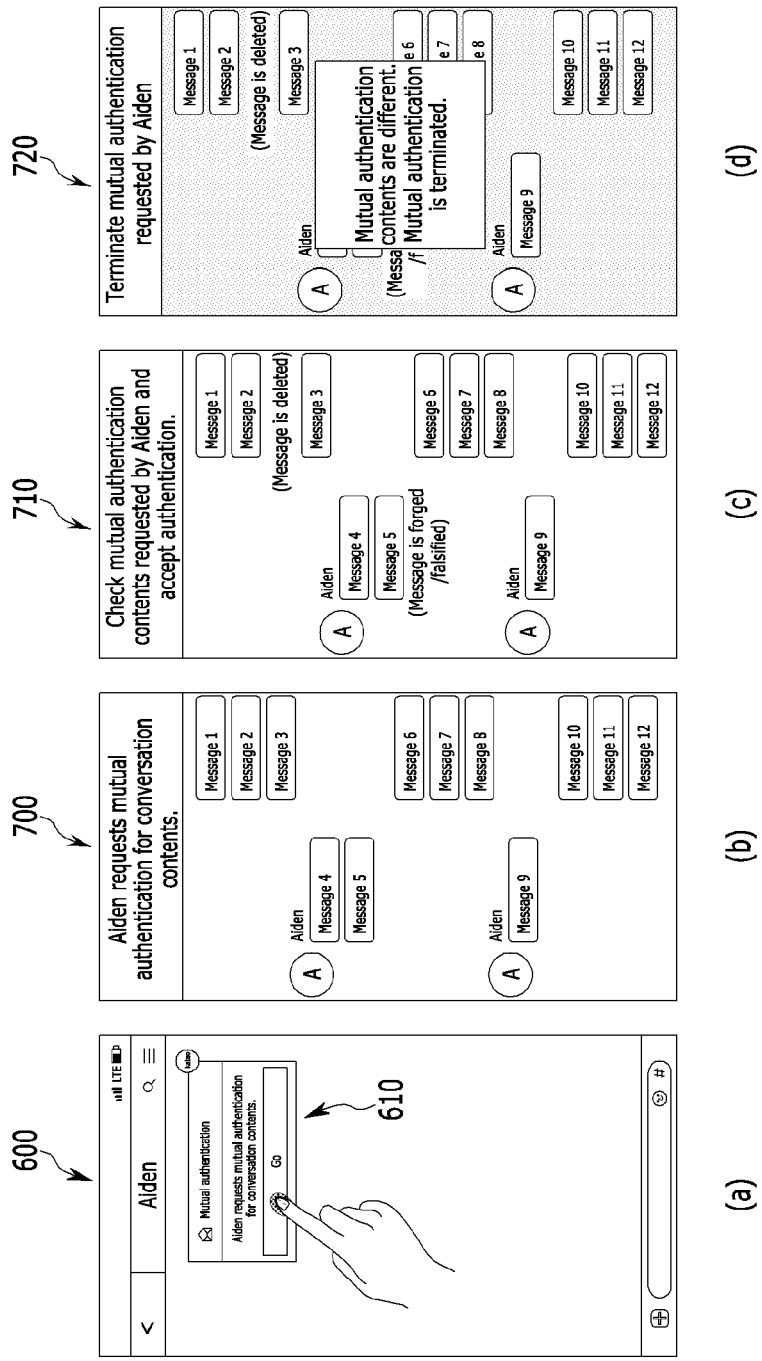
FIG. 10 is an example of a user interface screen through which an acceptor accepts authentication for the mutually authenticated contents according to the exemplary embodiment.

FIG. 10 is an example of a user interface screen through which an acceptor accepts authentication for the mutually authenticated contents according to the exemplary embodiment.

Referring to (a) of FIG. 10, an interface screen 600 of terminal B 110 displays a notification message of mutual authentication request 610 received from the messaging server 200. The notification message of mutual authentication request 610 may display information about Aiden.

Referring to (b) of FIG. 10, when the notification message of mutual authentication request 610 is selected, terminal B 110 displays a mutual authentication screen 700. The mutual authentication screen 700 may display the mutual authentication contents (from message 1 to message 12) and request a mutual authentication acceptance. When the mutual authentication contents are the conversation contents transmitted in the JSON format, terminal B 110 may render the mutual authentication contents to a chat room UI and display the mutual authentication contents.

Referring (C) of FIG. 10, when the mutual authentication contents are different from the local contents, terminal B 110 requests the mutual authentication acceptance in the mutual authentication screen 710, and may display that there is a deleted message between message 2 and message 3 of the mutual authentication contents or display that message 5 is the forged/falsified message.

Referring to (d) of FIG. 10, when the mutual authentication contents are different from the local contents, terminal B 110 may display that the mutual authentication is terminated instead of requesting the mutual authentication acceptance in the mutual authentication screen 720.

As described above, according to the exemplary embodiment, users may easily mutually authenticate and store contents, such as conversation contents, exchanged online, and manage and keep the mutually authenticated contents so as to check the mutually authenticated contents anytime.

According to the exemplary embodiment, it is possible to remove a possibility in that the conversation contents are forged/falsified by a specific user by mutually authenticating the contents, such as conversation contents, exchanged online, improve weight of evidence of the mutually authenticated contents. According to the exemplary embodiment, contents, such as contract contents, electronically signed by the contract parties may be used as a contract, and the contract parties may register the contract contents in a reliable notarization server or a reliable system, such as a block chain, and check the contract anytime anywhere while preventing the contract from being forged/falsified.

The aforementioned exemplary embodiment of the present disclosure is not implemented only by the apparatus and the method, and may be implemented by a program executing a function corresponding to the configuration of the exemplary embodiment of the present disclosure or a recording medium, in which the program is recorded.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method of providing, by a server, mutual authentication to mutual authentication participants for contents of a social media service, the method comprising:
   receiving a first message generated in a terminal of a requestor requesting mutual authentication for specific contents, wherein the first message includes the specific contents and a signature of the requestor for the specific contents;
   transmitting the specific contents to a terminal of an acceptor accepting the mutual authentication for the specific contents to allow the acceptor to authenticate the specific contents;
   receiving a second message generated in the terminal of the acceptor, wherein the second message is generated by authenticating the specific contents by the acceptor, and includes the specific contents and a signature of the acceptor for the specific contents; and
   storing the specific contents included in the first message and the second message as mutually authenticated contents by the requestor and the acceptor when the first message and the second message are verified based on the signature of the requestor and the signature of the acceptor,
   wherein the specific contents are selected in the terminal of the requestor displaying contents provided in the social media service.

2. The method of claim 1, wherein:
   the signature of the requestor is obtained by encrypting a hash value of the specific contents with a private key of the requestor, and the signature of the acceptor is obtained by encrypting the hash value of the specific contents with a private key of the acceptor, and
   the storing of the specific contents as the mutually authenticated contents includes:
   decrypting the signature of the first message by using a public key of the requestor, and verifying whether the requestor has transmitted the specific contents included in the first message based on a result of the decryption; and
   decrypting the signature of the second message by using a public key of the acceptor, and verifying whether the acceptor has transmitted the specific contents included in the second message based on a result of the decryption.

3. The method of claim 1, wherein:
the storing of the specific contents as the mutually authenticated contents includes:
verifying the first message and the second message;
when at least a part of the specific contents exists in a database storing an original provided in the social media service, generating server authentication representing that at least the part of the mutually authenticated contents is the original; and
storing the specific contents adding the server authentication.

4. The method of claim 3, wherein:
the storing of the specific contents as the mutually authenticated contents includes
obtaining original contents corresponding to at least the part of the specific contents, and when a hash tree of groups configuring the specific contents includes a hash tree of groups configuring the original contents, proving at least the part of the specific contents as the original, and
the hash tree of the groups configuring the specific contents is included in at least one of the first message and the second message.

5. The method of claim 1, wherein:
the first message further includes authentication context information of the terminal of the requestor, and
the second message further includes authentication context information of the terminal of the acceptor.

6. The method of claim 1, wherein:
the specific contents are conversation contents selected in a chat room of an instant messaging application displayed on a screen of the terminal of the requestor.

7. The method of claim 6, wherein:
the conversation contents selected in the chat room are local contents stored in the terminal of the requestor.

8. A method of providing, by a terminal of an acceptor having an application of a social media service, mutual authentication for contents of the social media service in linkage with at least one server, the method comprising:
receiving a first message requesting mutual authentication for specific contents selected by a terminal of a requestor from the server, the first message including the specific contents and a signature of the requestor for the specific contents;
displaying the specific contents to allow an acceptor to authenticate the specific contents;
when an authentication acceptance for the specific contents is entered by the acceptor, generating a second message for the specific contents and transmitting the second message to the server, the second message including the specific contents and a signature of the acceptor for the specific contents; and
receiving a mutual authentication result for the specific contents as a response to the second message from the server,
wherein the mutual authentication result is generated when the first message and the second message are verified based on the signature of the requestor and the signature of the acceptor.

9. The method of claim 8, wherein:
the displaying of the specific contents includes
displaying the specific contents received from the server on an authentication acceptance screen.

10. The method of claim 8, wherein:
the displaying of the specific contents includes
extracting local contents corresponding to the specific contents in local data stored, and when the specific contents received from the server are the same as the local contents, displaying the specific contents on an authentication acceptance screen.

11. The method of claim 10, further comprising:
when the specific contents are different from the local contents, terminating the mutual authentication for the specific contents.

12. The method of claim 8, wherein:
the displaying of the specific contents includes
extracting local contents corresponding to the specific contents in local data stored, and when the specific contents received from the server are different from the local contents, displaying a different portion between the specific contents and the local contents on an authentication acceptance screen.

13. A method of providing, by a server, mutual authentication to mutual authentication participants for conversation contents in a chat room of an instant messaging application, the method comprising:
receiving a first request message requesting mutual authentication for conversation contents in a chat room to an acceptor, from a terminal of a requestor, the first message including an electronic signature of the requestor for the conversation contents of the chat room;
transmitting a notification message of mutual authentication request for the conversation contents to a terminal of the acceptor to allow the acceptor to authenticate the conversation contents;
receiving a second message for the conversation contents from the terminal of the acceptor, where the second message is generated by authenticating the specific contents by the acceptor and includes an electronic signature of the acceptor for the conversation contents of the chat room;
storing the conversation contents authenticated by each of the terminal of the requestor and the terminal of the acceptor as mutually authenticated contents of the requestor and the acceptor when the first message and the second message are verified based on the electric signature of the requestor and the electric signature of the acceptor; and
transmitting a mutual authentication result message for the conversation contents to the terminal of the requestor and the terminal of the acceptor.

14. The method of claim 13, wherein:
the transmitting of the notification message of mutual authentication request includes
determining a participant of the chat room to which the conversation contents of the chat room are transmitted as the acceptor, or determining a user designated from the terminal of the requestor as the acceptor.

15. The method of claim 13, wherein:
the conversation contents are contents stored in the terminal of the requestor.

16. The method of claim 13, wherein:
the receiving of the second message includes
when the conversation contents are identically stored in the terminal of the acceptor, receiving the second message.

* * * * *